United States Patent
Wingate

(10) Patent No.: US 10,684,728 B2
(45) Date of Patent: Jun. 16, 2020

(54) FOCUSED CAPACITIVE SENSING

(71) Applicant: Analog Devices, Inc., Norwood, MA (US)

(72) Inventor: David Wingate, Provo, UT (US)

(73) Assignee: ANALOG DEVICES, INC., Norwood, MA (US)

( * ) Notice: Subject to any disclaimer, the term of this patent is extended or adjusted under 35 U.S.C. 154(b) by 0 days.

(21) Appl. No.: 15/517,135

(22) PCT Filed: Sep. 16, 2015

(86) PCT No.: PCT/US2015/050415
§ 371 (c)(1),
(2) Date: Apr. 5, 2017

(87) PCT Pub. No.: WO2016/057174
PCT Pub. Date: Apr. 14, 2016

(65) Prior Publication Data
US 2017/0242509 A1 Aug. 24, 2017

Related U.S. Application Data

(60) Provisional application No. 62/060,884, filed on Oct. 7, 2014.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ...... G06F 3/044; G06F 3/0416; G06F 3/0412; G06F 3/041; G02F 1/13338
See application file for complete search history.

(56) References Cited

U.S. PATENT DOCUMENTS

| | | | |
|---|---|---|---|
| 6,348,862 B1* | 2/2002 | McDonnell | B60N 2/002 180/272 |
| 6,687,887 B1* | 2/2004 | Teig | G06F 30/367 716/115 |

(Continued)

FOREIGN PATENT DOCUMENTS

| | | |
|---|---|---|
| JP | 2005/0538349 | 12/2005 |
| JP | 2012/0042280 | 3/2012 |

OTHER PUBLICATIONS

International Search Report and Written Opinion issued in International Patent Application Serial No. PCT/US2015/050415 dated Dec. 28, 2015, 13 pages.

(Continued)

*Primary Examiner* — Jose R Soto Lopez
(74) *Attorney, Agent, or Firm* — Patent Capital Group

(57) ABSTRACT

Capacitive sensing can be used to measure electrostatic features of a space. Rudimentary capacitive sensing can be blurry. For instance, the resolution of a capacitive sensor generating a simple electric field is not very high, and the response to the simple electric field is also not very high. Using many capacitive sensors and special sets of excitation signals exciting the capacitive sensors, the capacitive sensors can generate specialized electrostatic fields. Because the specialized electrostatic fields provide different views of the space, enhanced inferences can be made from measurements of responses to those specialized electrostatic fields. Selecting certain specialized electrostatic fields can allow capacitive sensors to sense a focused region of the space. Repeating the steps with varied electrostatic fields can allow capacitive sensors to make enhanced inferences for many focused regions of the space, thereby increasing the resolution of capacitive sensing.

20 Claims, 11 Drawing Sheets

(56) References Cited

U.S. PATENT DOCUMENTS

| | | | |
|---|---|---|---|
| 7,755,462 B2 | 7/2010 | Fullerton et al. | |
| 8,502,630 B2 | 8/2013 | Richards et al. | |
| 9,285,902 B1* | 3/2016 | Kremin | G06F 3/044 |
| 10,379,688 B2* | 8/2019 | Shepelev | G06F 3/0416 |
| 2008/0158167 A1* | 7/2008 | Hotelling | G06F 3/0416 |
| | | | 345/173 |
| 2009/0079707 A1 | 3/2009 | Kaehler et al. | |
| 2009/0315858 A1* | 12/2009 | Sato | G06F 3/0416 |
| | | | 345/174 |
| 2010/0060591 A1* | 3/2010 | Yousefpor | G06F 3/044 |
| | | | 345/173 |
| 2012/0268142 A1* | 10/2012 | Kremin | G06F 3/0416 |
| | | | 324/658 |
| 2013/0024169 A1* | 1/2013 | Veerasamy | B32B 17/10036 |
| | | | 703/2 |
| 2013/0033450 A1* | 2/2013 | Coulson | G06F 3/044 |
| | | | 345/174 |
| 2013/0050144 A1* | 2/2013 | Reynolds | G06F 3/0416 |
| | | | 345/174 |
| 2013/0169583 A1* | 7/2013 | Konradi | G06F 3/044 |
| | | | 345/174 |
| 2013/0300708 A1* | 11/2013 | Kim | G06F 3/044 |
| | | | 345/174 |
| 2014/0009406 A1* | 1/2014 | Guard | G06F 3/044 |
| | | | 345/173 |
| 2014/0022201 A1* | 1/2014 | Boychuk | G06F 3/041 |
| | | | 345/174 |
| 2014/0049507 A1* | 2/2014 | Shepelev | G06F 3/0412 |
| | | | 345/174 |
| 2014/0159748 A1 | 6/2014 | Cannon et al. | |
| 2014/0306903 A1* | 10/2014 | Huang | G06F 11/3485 |
| | | | 345/173 |
| 2015/0161963 A1* | 6/2015 | Kang | G06F 3/0412 |
| | | | 345/174 |
| 2015/0277657 A1* | 10/2015 | Azumi | G06F 3/0416 |
| | | | 345/174 |
| 2015/0355765 A1* | 12/2015 | Fukushima | G06F 3/0412 |
| | | | 345/174 |
| 2015/0370401 A1* | 12/2015 | Mizuhashi | G02F 1/13338 |
| | | | 345/174 |
| 2016/0070387 A1* | 3/2016 | Park | G06F 3/0416 |
| | | | 345/174 |
| 2016/0077617 A1* | 3/2016 | Lee | G06F 3/041 |
| | | | 345/173 |
| 2016/0224164 A1* | 8/2016 | Huang | G06F 3/0416 |
| 2016/0291735 A1* | 10/2016 | Nakanishi | G06F 3/0416 |
| 2016/0370946 A1* | 12/2016 | Hama | G06F 3/044 |
| 2017/0046007 A1* | 2/2017 | Kitagawa | G06F 3/041 |
| 2017/0205936 A1* | 7/2017 | Ishizaki | G06F 3/044 |
| 2017/0262124 A1* | 9/2017 | Gotoh | G02F 1/13338 |
| 2017/0293392 A1* | 10/2017 | Christiansson | G06F 3/0416 |
| 2018/0067155 A1* | 3/2018 | Reynolds | G01R 27/2605 |
| 2019/0227658 A1* | 7/2019 | Lin | G06F 3/04166 |

OTHER PUBLICATIONS

Michael B. Wakin et al., *An Architecture for Compressive Imaging*, Department of Electrical and Computer Engineering, Rice University, ICIP 2006, © 2006 IEEE, 4 pages.

Pawel Bajurko et al., *Design of Antennas and Antenna Arrays*, Resolution Project IST-026851, http://www.ife.ee.ethz.ch/RESOLUTION, Dec. 2007, 54 pages.

Ross Kinderman et al., *Markov Random Fields and Their Applications*, Contemporary Mathematics, American Mathematical Society, Providence, RI, © 1980, 147 pages.

Joshua Reynolds Smith, *Electric Field Imaging*, Massachusetts Institute of Technology, Feb. 1999, 216 pages.

Jonathan S. Yedidia et al., *Understanding Belief Propagation and its Generalizations*, Mitsubishi Electric Research Laboratories, http://www.merl.com, Nov. 2001, 26 pages.

Jonathan S. Yedidia et al., *Constructing Free Energy Approximations and Generalized Belief Propagation Algorithms*, Mitsubishi Electric Research Laboratories, http://www.merl.com, Dec. 2004, 34 pages.

* cited by examiner

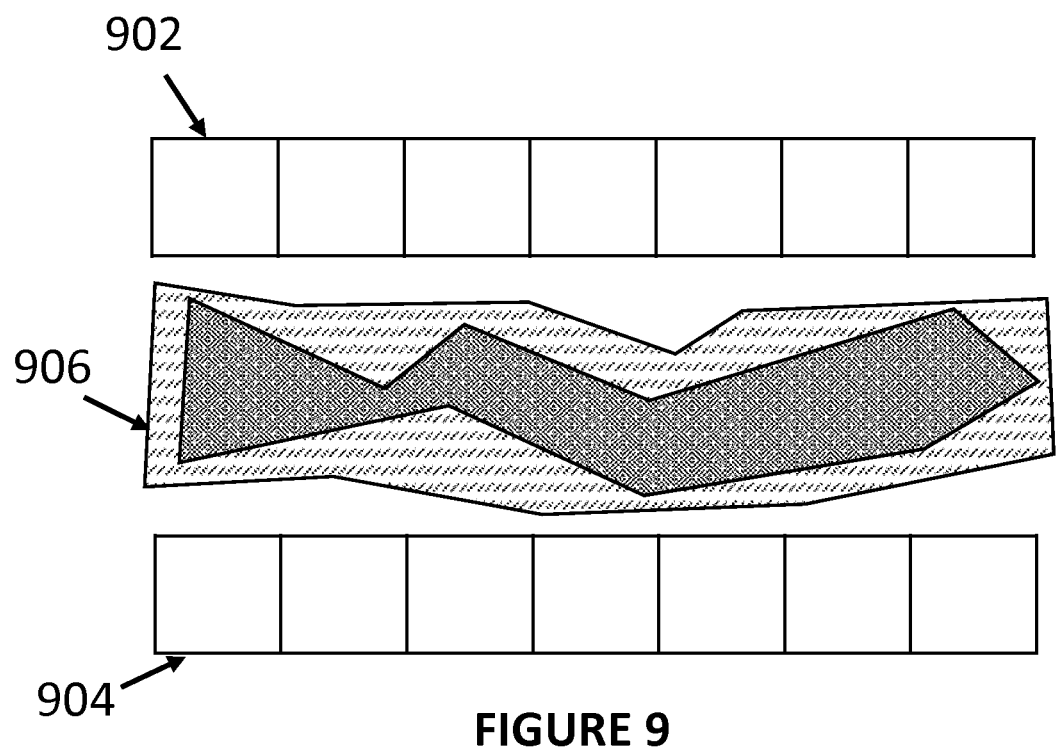
FIGURE 9
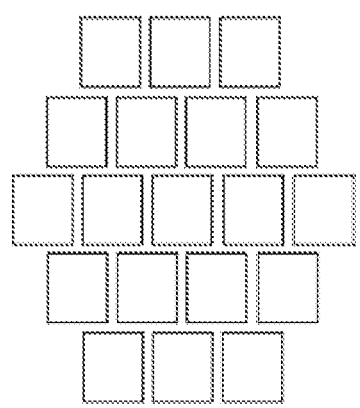 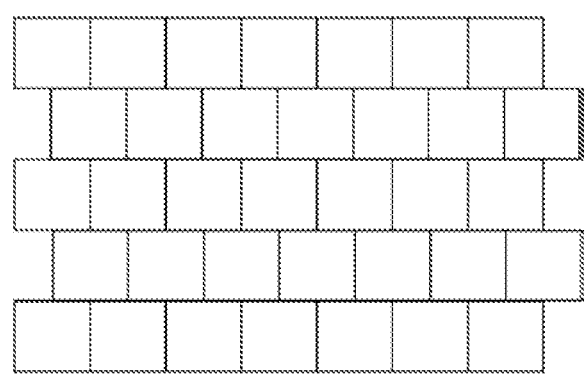
FIGURE 10  FIGURE 11

FOCUSED CAPACITIVE SENSING

CROSS-REFERENCE TO RELATED PATENT APPLICATION

This patent application claims priority to and/or receives benefit from U.S. Provisional Patent Application No. 62/060,884, titled "FOCUSED CAPACITIVE SENSING" and filed on Oct. 7, 2014. The Provisional Patent Application is hereby incorporated by reference in its entirety.

TECHNICAL FIELD OF THE DISCLOSURE

The present invention relates to the field of electronics, in particular to capacitive sensing.

BACKGROUND

A capacitor is an electronics component that has two conductive plates and an electric field between the two conductive plates. When the plates are charged, the capacitor electrostatically stores energy between the two plates. A capacitor is characterized by its capacitance, which is related to the amount of electric charge on each plate divided by the voltage potential difference between the plates. Capacitive sensing is a technology which measures changes in capacitance and uses the changes to infer information about the environment near a capacitive sensor.

OVERVIEW

Capacitive sensing can be used to measure electrostatic features of a space. Rudimentary capacitive sensing can be blurry. For instance, the resolution of a capacitive sensor generating a simple electric field is not very high, and the response to the simple electric field is also not very high. Using many capacitive sensors and special sets of excitation signals exciting the capacitive sensors, the capacitive sensors can generate specialized electrostatic fields. Because the specialized electrostatic fields provide different views of the space, enhanced inferences can be made from measurements of responses to those specialized electrostatic fields. Selecting certain specialized electrostatic fields can allow capacitive sensors to sense a focused region of the space. Repeating the steps with varied electrostatic fields can allow capacitive sensors to make enhanced inferences for many focused regions of the space, thereby increasing the resolution of capacitive sensing.

BRIEF DESCRIPTION OF THE DRAWING

To provide a more complete understanding of the present disclosure and features and advantages thereof, reference is made to the following description, taken in conjunction with the accompanying figures, wherein like reference numerals represent like parts, in which:

FIGS. 7-28 show various arrangement and designs of capacitive sensors providing focused capacitive sensing, according to some embodiments of the disclosure.

DESCRIPTION OF EXAMPLE EMBODIMENTS OF THE DISCLOSURE

Understanding Capacitive Sensing

Figure 1:
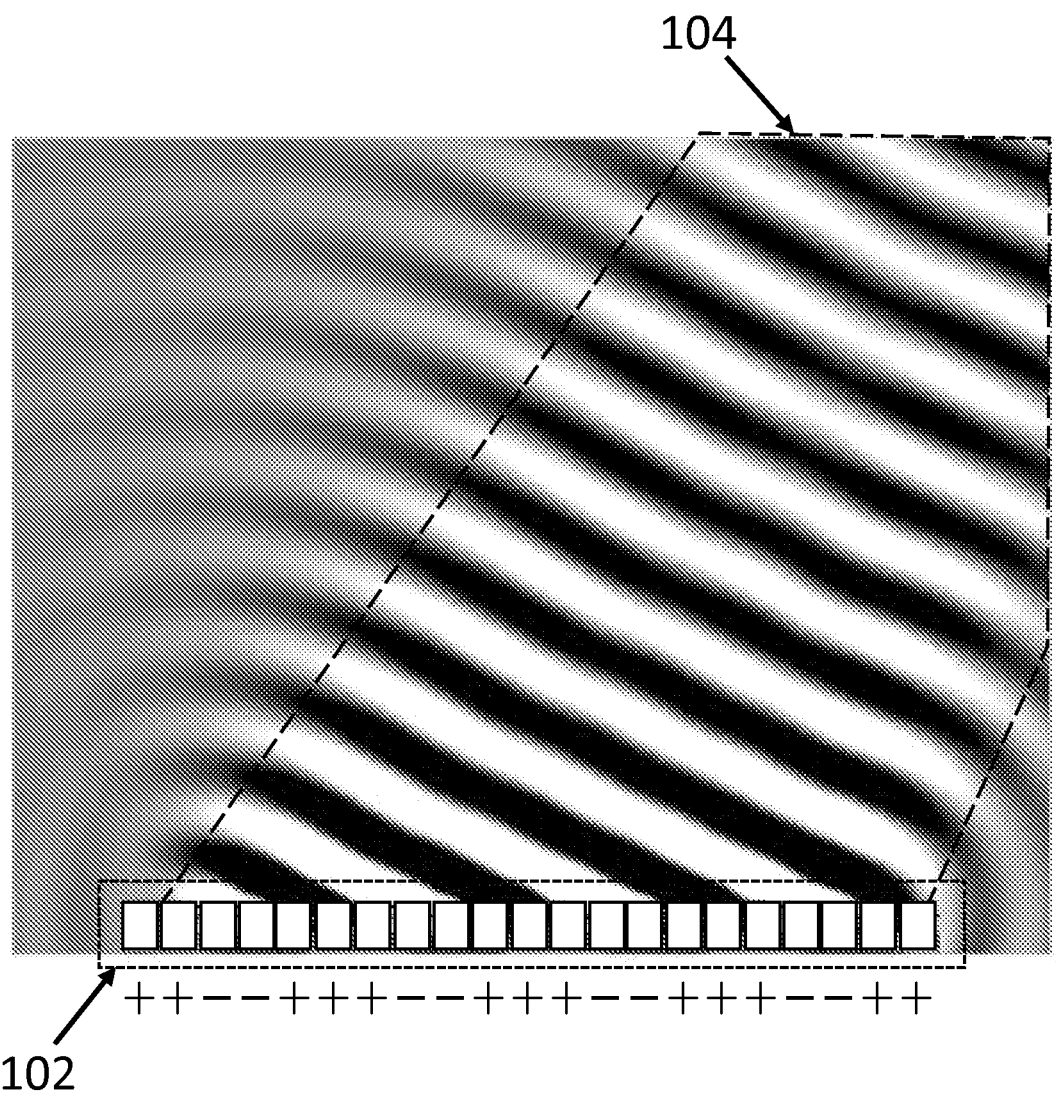
FIG. 1 shows an illustrative electrostatic field generated using capacitive sensors excited by a particular set of excitation signals, according to some embodiments of the disclosure.

Capacitive sensing is extremely versatile. Capacitive sensors generally detect anything that is conductive, even minimally conductive or has a dielectric different than that of air, for example, part of a human hand or finger. Furthermore, electrostatic effects are present in many places in the environment, e.g., between objects, inside a material, etc. For these reasons, electronics designers have used capacitive sensing in many applications in sensing the environment, such as to detect proximity or movement of an object, humidity, fluid level, on so on.

When an excitation signal charges a capacitive sensor (e.g., an electrode), the capacitive sensor becomes one of the two plates of a virtual capacitor. When an object comes close to the capacitive sensor acting as the second plate of the virtual capacitor, the virtual capacitance based on the charge present on the capacitive sensor can be detected by the capacitive sensor and measured by a capacitive sensing controller. A capacitive sensing controller is an electronic device which can include an analog front end (typically having a capacitance to digital converter) which is configured to measure the virtual capacitance as observed by the capacitive sensor and convert the analog measurement to digital data. Some capacitive sensing controllers can generate high resolution capacitive measurement data, as high as 16-bits or more for each capacitive sensor. The capacitive sensing controller can also provide an excitation source for providing the excitation signal to the capacitive sensor. Typically, the capacitive sensing controller can have a plurality of input pins connectable to a number of capacitive sensors.

By exciting a capacitive sensor to generate an electric field and sensing disturbances in the electric field, the capacitive sensor can sense when an object is moving relative to the sensor. Specifically, capacitive sensing has been used with touch screens for some time to allow user to provide user input via the screen of a mobile device without the use of physical buttons. In some applications, capacitive sensing on a large surface/skin can even be used for sensing grip or hand postures. Many of these applications of capacitive sensing have been rather limited to activation of a button, detection of postures or gesturing, measuring proximity, etc. The limits in these applications of capacitive sensing could be attributed to that capacitive sensing is often "blurry", i.e., the resolution of a capacitive sensor is not very high, even when more than one capacitive sensor is used. Challenges remain for deriving a high resolution view of the environment using capacitive sensing.

How to Extract More Information about a Space

One possible way to extract more information about an environment using capacitive sensing is to make more measurements on a space of interest within the environment (herein referred to as a "space"). Making more measurements can gather more or additional information about the space than making just one measurement. However, making additional measurements is not trivial. Repeating exact same measurements of the space may not provide a whole lot of additional information.

Suppose capacitive sensors can be excited in different ways to generate specialized electrostatic fields. Different electrostatic fields can elicit different responses of the space. By applying different electrostatic fields, it is possible to take a measurement for each of the responses to those different electrostatic fields. The measurements would provide different "views" of the space. Put differently, the measurements of the responses to these different electrostatic fields can be considered different "snapshots" of the space from different "perspectives", thus providing additional interesting information on the space.

A plurality of capacitive sensors can generate many different electrostatic fields, using information theoretically motivated codes, patterns, spatial arrangements, and/or sets of excitation signals, etc. Any one response to a specialized electrostatic field may not provide a lot of information. It might not even give a focused measurement. However, when the electrostatic field can be changed dynamically, it is possible to probe a region of space or fluid or solid using a sequence of electrostatic fields to obtain different "views" of that region. Using the measurements of the responses to these electrostatic fields, it is possible to solve for some quantity or feature at the focused region in the space. It is even possible to generate many electrostatic fields and make measurements of responses to those fields to allow some quantity or feature to be solved for a plurality of focused regions in the space.

The following passages describe how to excite capacitive sensors in such a way to make specialized measurements and how the specialized measurements can be used to make enhanced inferences on one or more features of the space.

Exemplary Electrostatic Fields and Combination Thereof

FIG. 1 shows an illustrative electrostatic field generated using capacitive sensors excited by a particular set of excitation signals, according to some embodiments of the disclosure. For this example, there are 21, uniformly sized and shaped, capacitive sensors 102 arranged in a row. The example is not intended to be limiting to the disclosure. Other number of sensors, arrangements, sizes, and/or shapes of capacitive sensors are envisioned by the present disclosure.

A capacitive sensor, provided by an electrode or a piece of conductive material, can be excited to have positive polarity (denoted in the FIGURES as "+") or negative polarity (denoted in the FIGURES as "−"). Positive polarity and negative polarity of a capacitive sensor can be associated with an electrode having either positive charge or negative charge. Polarities can be generated by applying different voltage potentials to the capacitive sensors using a certain set of excitation signals.

When capacitive sensors 102 are excited with a first set of excitation signals, the sensors can be excited to have a pattern of positive polarities and negative polarities. The relative strength of the polarities (e.g., among capacitive sensors with the same or different polarities) can also differ depending on the voltage potentials applied to the capacitive sensors. Broadly speaking, using different sets of excitation signals to excite the capacitive sensors, the capacitive sensors can generate different electrostatic fields. Each of the different electrostatic fields can be fuzzy or blurry in some regions, and sharp in some other regions of the space. The blurriness or sharpness relates to how strong a response would be in a region to the electrostatic field, or how large the dynamic range would be for a response in that region.

In this example, the capacitive sensors 102 are excited to have polarities according to the following polarities, from left to right, [+, +, −, −, +, +, +, −, −, +, +, +, −, −, +, +, +, −, −, +, +]. It can be seen that the capacitive sensors generate an electrostatic field which is fuzzy or blurry on the left side. However, the electrostatic field is sharp, near the capacitive sensors 102, in an area veering to the right (denoted by region 104).

Figure 2:
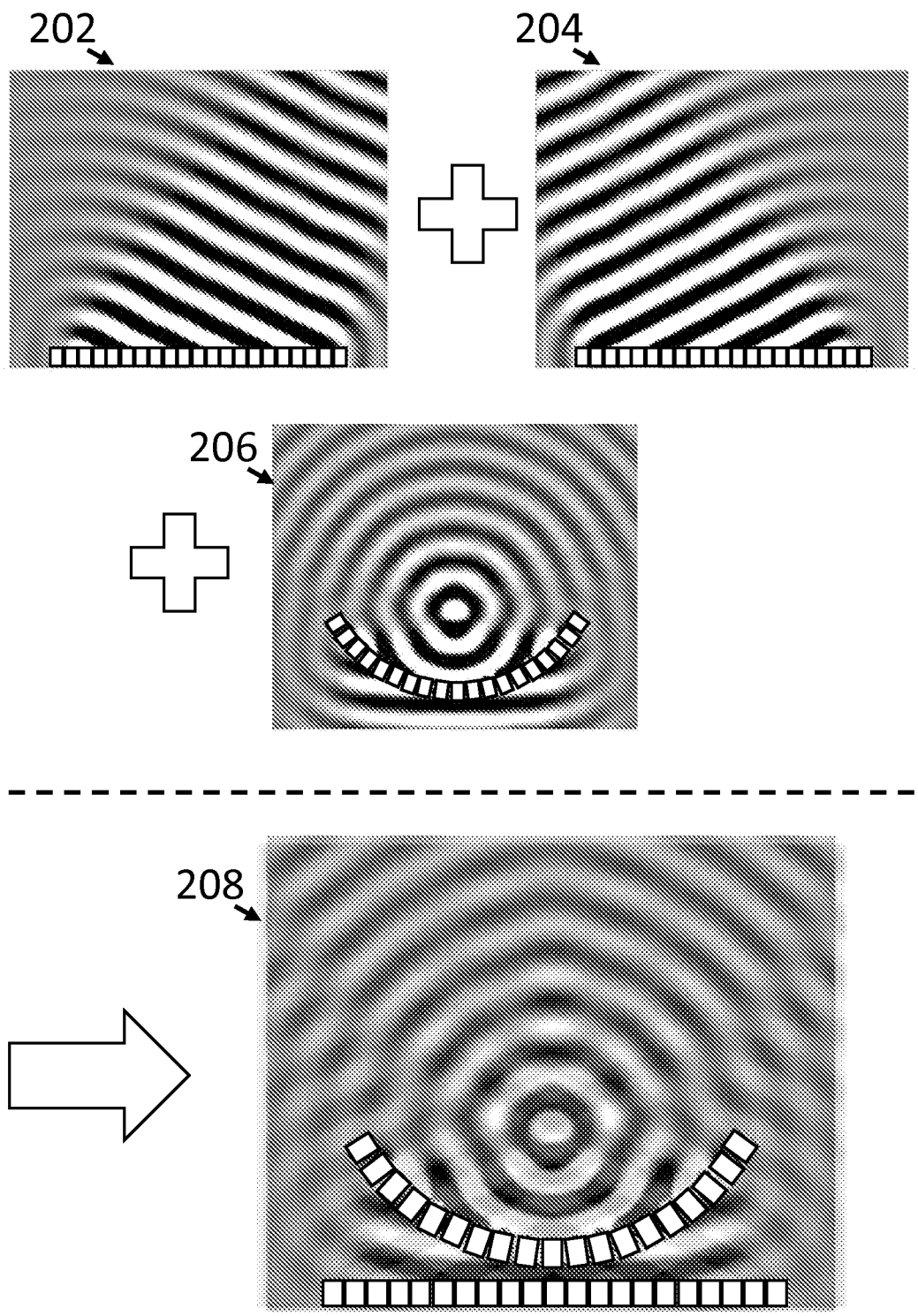
FIG. 2 shows a combination of some illustrative electrostatic fields generated using capacitive sensors excited by different sets of excitation signals, according to some embodiments of the disclosure.

By changing the set of excitation signals used to excite the capacitive sensors and/or the spatial arrangement of the capacitive sensors, it is possible to produce many different electrostatic fields. FIG. 2 shows a combination of some illustrative electrostatic fields generated using capacitive sensors excited by different sets of excitation signals, according to some embodiments of the disclosure. For instance, the same array of capacitive sensors (e.g., such as capacitive sensors 102 as seen in FIG. 1) can be excited using different sets of excitation signals to change positive or negative polarity of each of the sensors to generate different electrostatic fields. In another instance, capacitive sensors physically arranged differently and excited using the same or different set of excitation signals can also generate different electrostatic fields.

The electrostatic field 202 corresponds to the one seen in FIG. 1. The electrostatic field 204 is generated by reversing the polarity for each of the capacitive sensors relative to the polarities of the capacitive sensors generating electrostatic field 202. It can be seen that the electrostatic field 204 is fuzzy or blurry on the right side. However, the electrostatic field is sharp, near the capacitive sensors 102, in an area veering to the left. The electrostatic field 206, generated by capacitive sensors in a curved arrangement with a similar set of excitation signals as ones used for generating the electrostatic fields 202 and 204, has a sharp region near the sensors directly in front of the capacitive sensors and is blurry outside of the sharp region.

When the three electrostatic fields 202, 204 and 206 are superimposed over each other (shown as visualization 208), a "focused" region in front of the capacitive sensors has a multifaceted and sharp pattern while the region outside out of that region is blurry. For this "focused" region, it is possible to measure responses to the electrostatic fields 202, 204 and 206 to obtain different "snapshots" of the focused region from different "perspectives" of the space.

Figure 3:
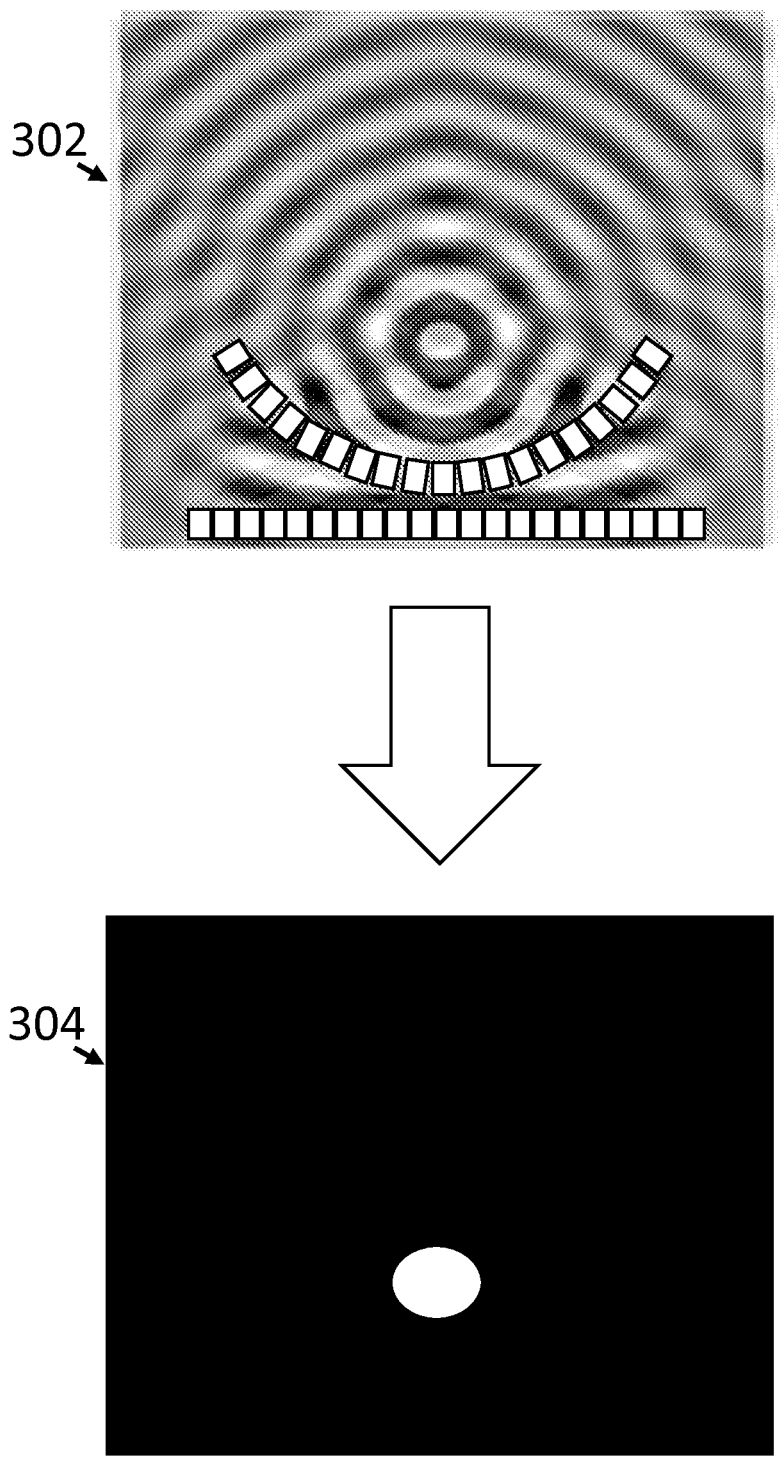
FIG. 3 illustrates using different electrostatic fields to make an enhanced inference focused in a region of a space, according to some embodiments of the disclosure.

FIG. 3 illustrates using different electrostatic fields to make an enhanced inference focused in a region of a space, according to some embodiments of the disclosure. Leveraging the three different electrostatic fields (shown as visualization 302), capacitive sensors can measure the different responses to those different electrostatic fields. With appropriate processing, the measurements can be processed and/or combined to make an enhanced inference on the focused region (shown as the white circle in visualization 304). A model may be provided to describe known interactions between different materials, surfaces, shapes, and/or objects with the different electrostatic fields. Using such a model, an inference engine can infer one or more features of the materials, surfaces, shapes, and/or objects based on the measurements.

The embodiment discussed in relation to FIGS. 2 and 3 describes an example of probing a focused region in a space with different electrostatic fields and taking multiple measurements of responses to those different electrostatic fields in order to make enhanced inferences on the space. The embodiment generates different electrostatic fields by exciting capacitive sensors using different sets of excitation signals (e.g., corresponding to different codes/patterns) and/or by using different spatial arrangements of the capacitive sensors. The embodiment is not intended to be limiting. Other possibilities exist for generating different electrostatic fields. For instance, the shapes of the capacitive sensors can lead to different electrostatic fields being generated. In another instance, using different substances, substrates or materials for providing the capacitive sensors can also lead to different electrostatic fields being generated. The varying manners of generating electrostatic fields are not limited to ones explicitly disclosed herein.

Improved System for Focused Capacitive Sensing

Figure 4:
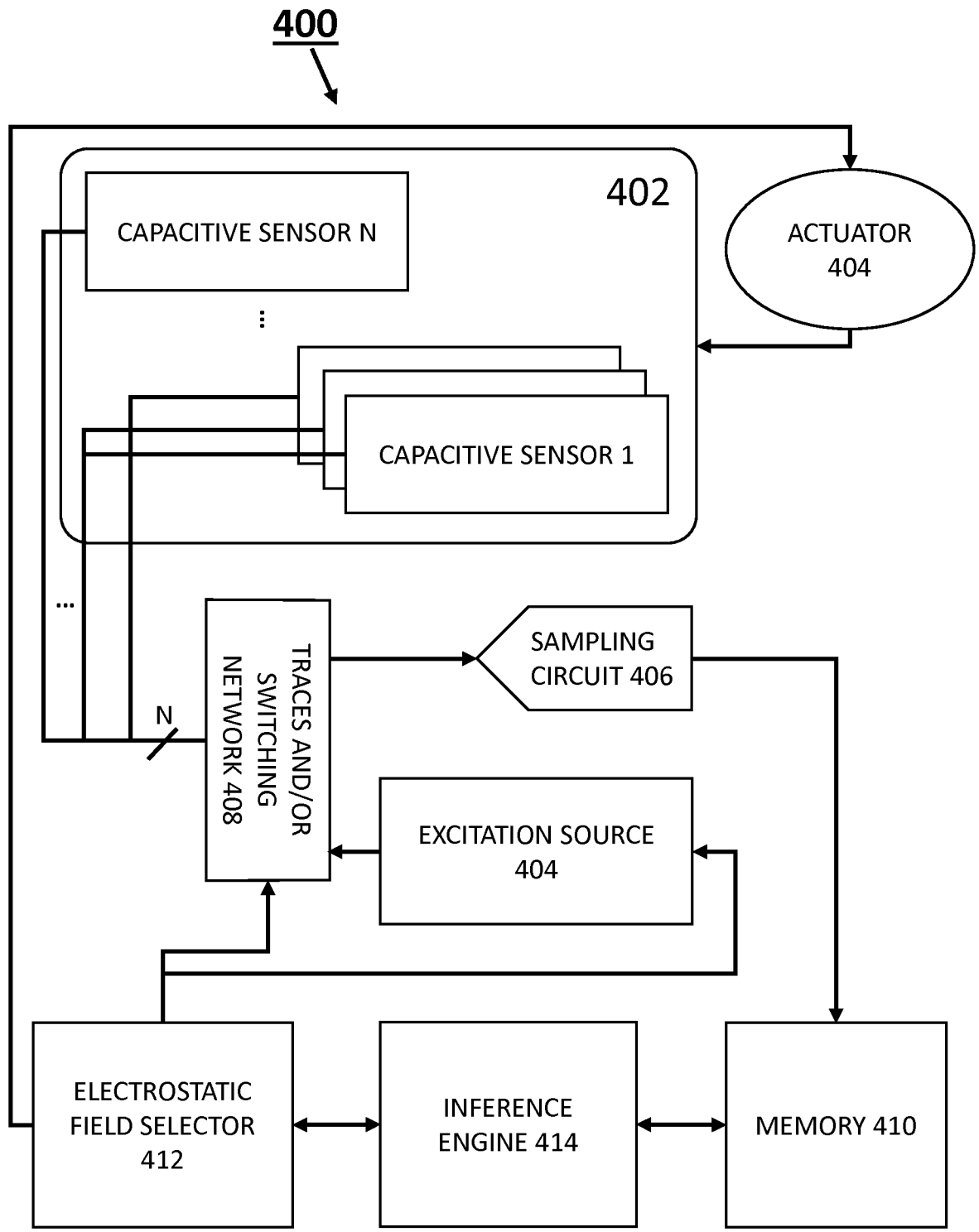
FIG. 4 shows an exemplary system for focused capacitive sensing, according to some embodiments of the disclosure.

FIG. 4 shows an exemplary system for focused capacitive sensing, according to some embodiments of the disclosure. To provide focused capacitive sensing of a space using capacitive sensors, the system 400 includes N capacitive sensors 402 for generating different electrostatic fields and capacitive sensing (N can be any positive integer greater than or equal to 2). Different electrostatic fields can be generated for different points in time, depending on how the capacitive sensors 402 are excited. To excite the capacitive sensors 402, an excitation source 404 can be included as part of system 400. Furthermore, the system 400 can include sampling circuit 406 for taking measurements using the capacitive sensors 402. The capacitive sensors 402 can be communicably coupled or electrically connected to excitation source 404 and sampling circuit 406 via traces and/or switching network 408.

In some embodiments, the traces and/or switching network 408 has two modes of operation. In one mode, the traces and/or switching network 408 connects excitation source 404 to one or more selected capacitive sensors 402 to excite the capacitive sensors 402 with a set of excitation signals generated by the excitation source 404. In another mode, the traces and/or switching network 408 connects the sampling circuit 406 to one or more selected capacitive sensors 402 to sample or take measurements using the capacitive sensors.

During operation, the excitation source 404 excites the capacitive sensors using different sets of excitation signals to generate different electrostatic fields. The excitation source 404 can include a waveform generator for generating signals having different voltage or current waveforms to excite the capacitive sensors 402. The sets of excitation signals can excite some capacitive sensor(s) to have a positive polarity and some capacitive sensor(s) to have a negative polarity. Exemplary signal waveforms can include sine waves, sawtooth waves, square waves, triangle waves, etc. The excitation signals generated can have different phases from each other to provide the positive/negative polarities for the capacitive sensors 402. For instances, two excitation signals (of a set of excitation signals) can be 30, 60, 90, 120, 150, 180, 210, 240, 270, 300 degrees out of phase. In some cases, the excitation signals generated can have different amplitudes or magnitudes from each other to cause a specific electrostatic field to be generated by the capacitive sensors 402.

Also during operation, the sampling circuit 406 takes measurements using the capacitive sensors to capacitively sense responses of the space to the different electrostatic fields. A measurement taken using the capacitive sensors can include one or more capacitance data values for each of the capacitive sensors used for taking the measurement. The sampling circuit 406 can include a capacitance to digital converter for converting capacitive sensor measurements into digital data (e.g., capacitance data values) which can be stored in memory 410 (e.g., computer or machine readable non-transitory storage medium). Some sampling circuits can include ancillary digital filters for noise reduction, calibration features against temperature changes or motion, and so on.

To excite the capacitive sensors 402 with different sets of excitation signals, the system 400 can include an electrostatic field selector 412. The electrostatic field selector 412 can signal to the excitation source 404 to excite the capacitive sensors 402 using a particular set of excitation signals to generate a particular electrostatic field. In some cases, the electrostatic field selector 412 can signal to an actuator to physically rearrange one or more ones of the capacitive sensors 402.

Broadly speaking, the electrostatic field selector 412 can implement any related functions for enabling the capacitive sensors to probe a region of space using different electrostatic fields. For instance, the electrostatic field selector 412 can determine a particular set of excitation signals for the excitation source 404. In some cases, the electrostatic field selector 412 can signal to the traces and/or switching network 408 to select certain ones of the capacitive sensors 402 to excite to cause a different electrostatic field to be generated by the capacitive sensors 402. In some cases, the electrostatic field selector 412 can also select certain ones of the capacitive sensors 402 to use for taking a measurement of the response to the electrostatic field using a certain arrangement of capacitive sensors. In some scenarios, the electrostatic field selector 412 can signal to the excitation source to excite (only) a subset of the capacitive sensors. In some scenarios, the electrostatic field selector 412 can signal to the traces and/or switching network 408 to take measurement using (only) a second subset of the capacitive sensors different (but can have common capacitive sensors) from the first subset of capacitive sensors. For some cases, the electrostatic field selector 412 can signal to actuator 404 to at least some of the capacitive sensors to a different spatial arrangement to generate different electrostatic fields and/or take measurements in response to different electrostatic fields in a certain manner.

To make enhanced inferences, the system 400 includes inference engine 414 for processing the measurements (e.g., stored in memory 410) and deriving one or more features of the space based on the measurements. The inference engine 414 can access a model and/or measurements stored in memory 410 and/or execute instructions stored in memory 410. The inference engine 412 can also interact with electrostatic field selector 412 to change or select certain electrostatic fields to be generated by the capacitive sensors to improve inference making.

Exemplary Method for Focused Capacitive Sensing

Figure 5:
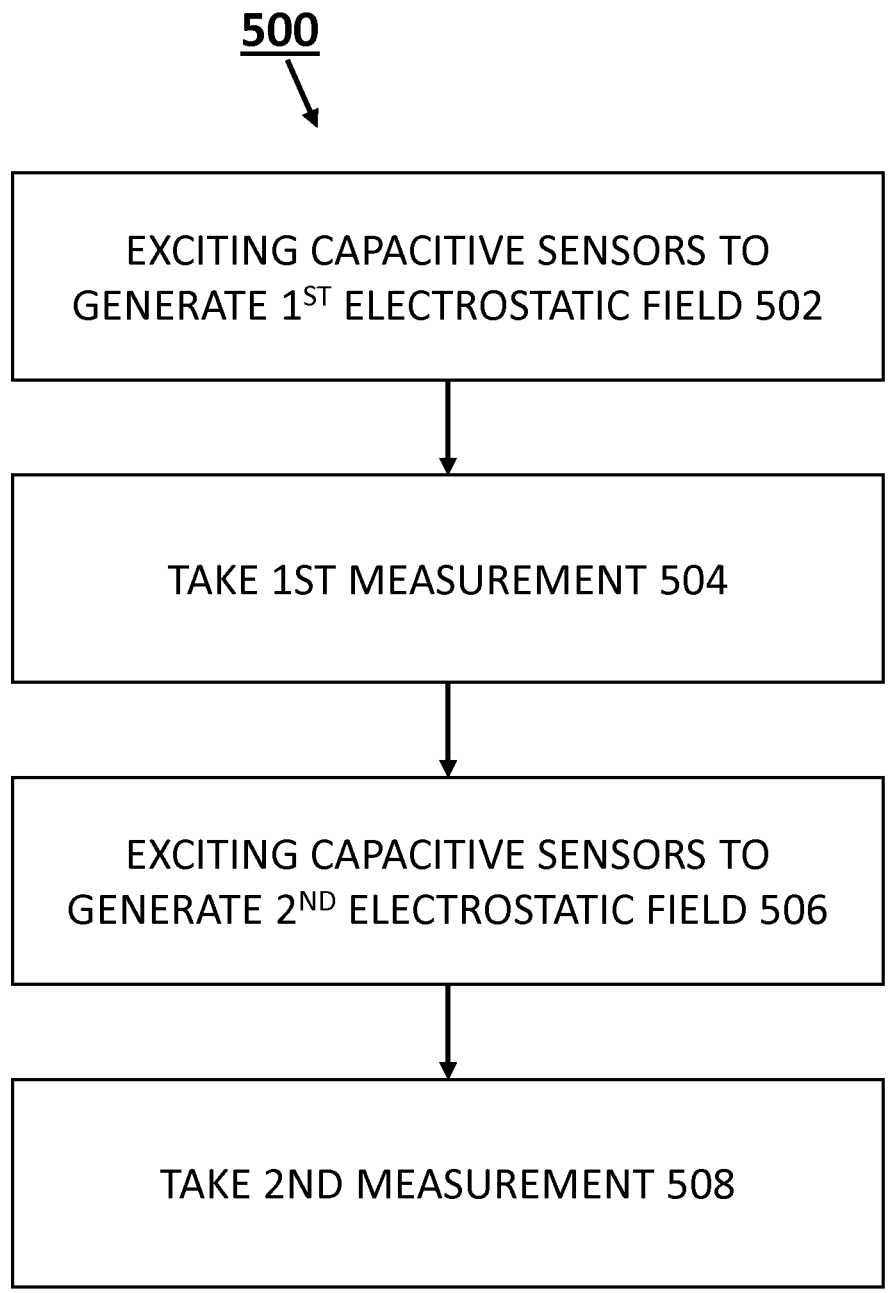
FIG. 5 is a flow diagram illustrating an exemplary method for focused capacitive sensing of a space using capacitive sensors, according to some embodiments of the disclosure.

FIG. 5 is a flow diagram illustrating an exemplary method for focused capacitive sensing of a space using capacitive sensors, according to some embodiments of the disclosure. The method 500 includes exciting the capacitive sensors using a first set of excitation signals to generate a first electrostatic field (box 502). The first set of excitation signals excite some capacitive sensor(s) to have a positive polarity and some capacitive sensor(s) to have a negative polarity. Then, a first measurement is taken using the capacitive sensors to capacitively sense a first response of the space to the first electrostatic field (box 504). The method 500 further includes exciting the capacitive sensors using a second set of excitation signals different from the first set of excitation signals to generate a second electrostatic field different from the first electrostatic field (box 506). The second set of excitation signals excite some capacitive sensor(s) to have a positive polarity and some capacitive sensor(s) to have a negative polarity. Then, a second measurement is taken using the capacitive sensors to capacitively sense a second response of the space to the second electrostatic field (box 508).

The method 500, typically performed by an excitation signal source and a sampling circuit, can repeat for other sets of excitation signals and/or spatial arrangements of the capacitive sensor to probe one or more focused regions of the space using different electrostatic fields. Different electrostatic fields can be selected by an electrostatic fields selector. Multiple measurements can be combined to make an enhanced inference, which can be performed by an inference engine.

Another Exemplary Method for Focused Capacitive Sensing

Figure 6:
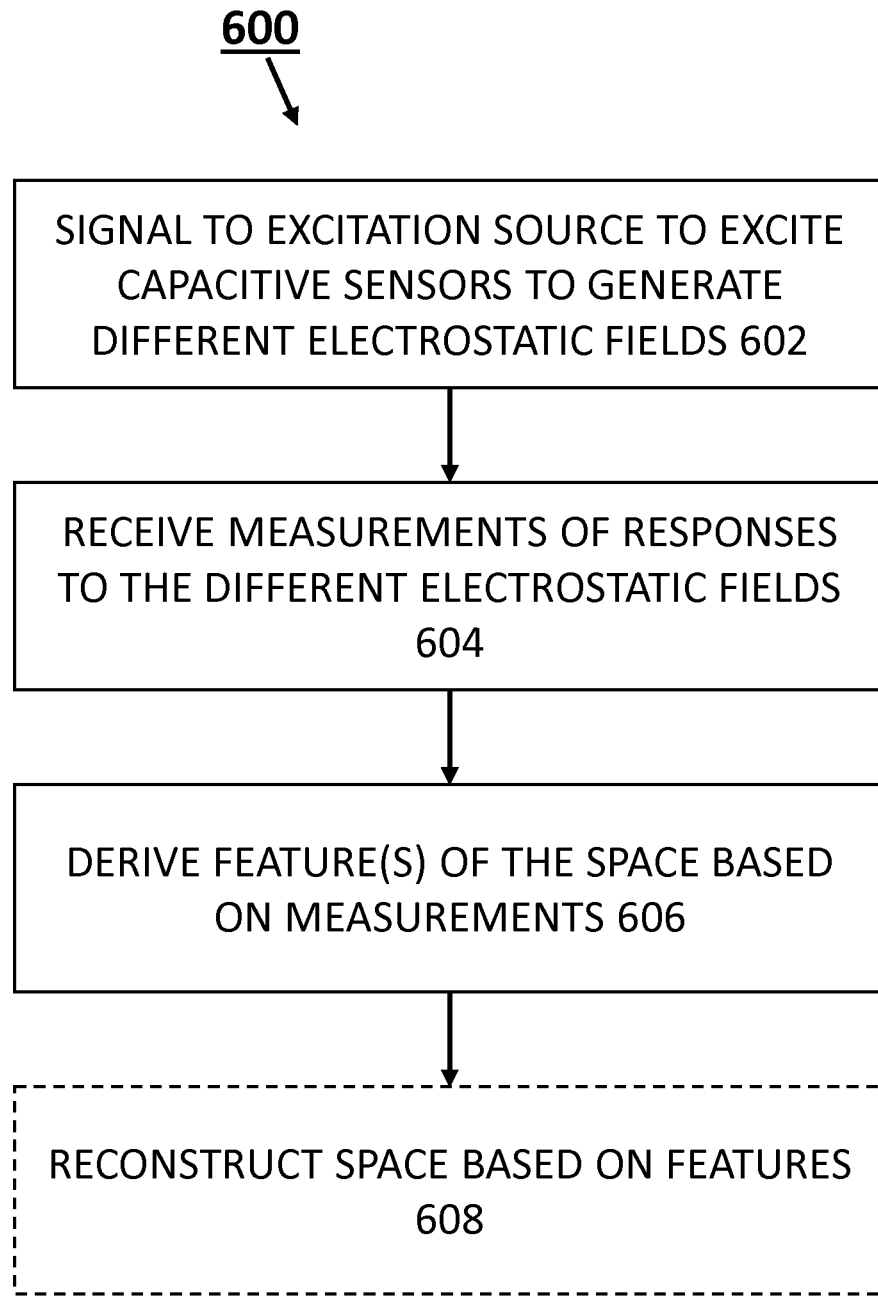
FIG. 6 is a flow diagram illustrating another exemplary method for focused capacitive sensing of a space using capacitive sensors, according to some embodiments of the disclosure.

FIG. 6 is a flow diagram illustrating another exemplary method for focused capacitive sensing of a space using capacitive sensors, according to some embodiments of the disclosure. The method 600 includes signaling to an excitation source to excite the capacitive sensors using a first set of excitation signals to generate a first electrostatic field (box 602). The first set of excitation signals excite some capacitive sensor(s) to have a positive polarity and some capacitive sensor(s) to have a negative polarity. The method 600 further includes receiving first measurement taken by the capacitive sensors to capacitively sense a first response of the space to the first electrostatic field (box 604). The method 600 repeats for a plurality of different electrostatic fields, such as signaling to the excitation source to excite the capacitive sensors using a second set of excitation signals to generate a second electrostatic field different from the first electrostatic field (box 602). The second set of excitation signals excite some capacitive sensor(s) to have a positive polarity and some capacitive sensor(s) to have a negative polarity. The method 600 further includes receiving a second measurement taken by the capacitive sensors to capacitively sense a second response of the space to the second electrostatic field (box 604).

Exemplary Application in Imaging

In some implementations, the features inferred from multiple measurements of the space using many electrostatic fields may be used to generate virtual display models and/or images of the object. These images can be useful in analyzing samples or objects, patients, parts of a living being, fluid, etc. For instance, variations in the dielectric constant or densities in different regions of the space may allow focused capacitive sensor arrays as described herein to sense and display internal structures of an object present in the space. Surfaces between different materials or characteristics of these surfaces can also be inferred from the measurements. In some applications, the internal structure of a hand or foot may be displayed based on the measurements of responses of the skin, muscle, and/or bone to the specialized electrostatic field. Geological samples can also be displayed based on measurements of responses of samples to the specialized electrostatic field.

It is noted that imaging using capacitive sensing is superior over conventional magnetic resonance imaging (MRI) for several reasons. Equipment for MRI can be expensive, unwieldy, and challenging to create because engineers strive to generate strong uniform magnetic fields with gigantic magnets. Furthermore, capacitive sensing does not require metal implants to be removed prior to scanning a living being. Moreover, capacitive sensing can be more applicable due to electrostatic fields being present (even without excitation) in many more places in the environment than magnetic fields.

Deriving Features Based on Multiple Measurements

As mentioned previously, an inference engine can make inferences about objects or materials (even air) in a focused region of the space using measurements of responses to different electrostatic fields. Continuing to refer to FIG. 6, the method 600 can further include deriving one or more features of the space based on the first measurement (of a first response of the space to a first electrostatic field) and the second measurement (of a second response of the space to a second electrostatic field) (box 606). In many cases, the method 600 can further include repeating the signaling and receiving steps for a plurality of other electrostatic fields generated by the capacitive sensors using other sets of excitation signals (boxes 602 and 604), and deriving one or more features of the space based on further measurements from the repeated receiving step (box 606). This can be particularly advantageous for applications when viewing inside the object is not possible or convenient, and/or applications where machine imaging or sensing of objects or materials in a space is desired. For instance, dielectric constants of different body tissues are very distinct, and the inference engine can make inferences bout the dielectric constants associated with one or more regions in the space to sense a body having different types of body tissues.

Generally speaking, inference making involves having a model. The model can include some assumptions relating possible features of the space with measurements. Using the model, an inference engine can make inferences on features of the space based on measurements obtained from the different electrostatic fields. For instance, presence of a feature can be associated with a distribution of expected measurements. When the inference engine observes a particular measurement, and determines that the particular measurement is within the distribution of measurements associated with the presence of a feature, the inference engine can, under appropriate conditions, make an inference that the feature is present.

Based on the measurements, one or more features of those objects or materials in a particular region can be inferred using a suitable model of the space. These features may include one or more of the following: (1) position information of an object or part of the object (such as boundary, position, or depth information of an object or surface), (2) position information of a particular type of material (such as boundary, position, or depth information of a particular type of material), (3) the dielectric constant of a type of material in a particular region (to identify a type of material or compute density of a material), (4) presence/existence information of an object or part of an object, a material, or a part of a model (e.g., presence/existence of parts of an abstract model of the space), (5) probabilities of a part of a model being present or being true, (6) (pixel) values of an image representative of the space, (7) density values of regions in the space, (8) any characteristics of materials in the space, etc.

The following passages describes some illustrative models which can be used to make enhanced inferences on a particular focused region of the space, or on many regions of the space.

Exemplary Models for Inferring One or More Features of a Focused Region of a Space One model for making an inference relates to approximating a dielectric constant of a focused region of the space based on multiple measurements of responses to different electrostatic fields. The model can include assumptions which relates different dielectric constants (hypotheses) with possible measurements of responses to different electrostatic fields (possible observations). In some cases, the assumptions may allow the inference engine to compute probabilities of various dielectric constants given that the multiple measurements are observed using statistical inference such as Bayesian inference. The inference engine can estimate the dielectric constant based on the computed probabilities.

Another model for making an inference relates to determining the presence of a particular type of material among a predefined set of materials in a focused region of the space based on multiple measurements of responses to different electrostatic fields. The model can include assumptions which relates different types of materials (hypotheses) with possible measurements of responses to different electrostatic fields (possible observations). In some cases, the assumptions may allow the inference engine to compute probabilities of various types of materials given that the multiple measurements are observed using statistical inference such as Bayesian inference. The inference engine can output a determined type of material based on the computed probabilities.

Besides statistical models, other models such as decision trees or regression models can be used as well.

In some embodiments, one model for making an inference relates to approximating a dielectric constant of a focused region of the space based on multiple measurements of responses to pseudo-randomized electrostatic fields.

Exemplary Models for Inferring Features of Many Regions of a Space

More complex "global" models of the space can also be provided to make inferences on many regions of the space. When an electrostatic field travels through the space, the responses to the electrostatic fields are often affected by one or more objects and/or materials in the space, which in turn have complex interactions with each other. Various features, e.g., part(s) of an object or different objects, various materials, or even air, can affect each other within the region. While certain interactions between these features are linear, many interactions between features can be codependent.

One possible model of the space is a graphical model, which can effectively formulate these interactions mathematically. Broadly speaking, a graphical model includes a plurality of nodes, which can represent variables having a number of possible states, and a plurality of edges, which can represent quantitative (sometimes statistical) relationship between two nodes. The edges can be directed. If formulated properly, a graphical model can effectively describe a complex, interdependent network of the space as affected by the electrostatic field generated by the capacitive sensors, the objects, and materials therein. A belief propagation network passes messages along the edges between the nodes, which describes the influence that one node exerts on another, i.e., modeling the interactions between different parts of objects, materials, and capacitive sensors in the space. Leveraging the belief propagation network, the measurements can be used a boundary condition to determine one or more possible versions of the space that would best explain or fit with the measurements.

Given an appropriate formulation of the space using a graphical model, it is possible to make inferences using a belief propagation network or a similar message passing algorithm. For instance, an inference engine can derive one or more features of the space by applying belief propagation using at least the first measurement (of a first response of the space to a first electrostatic field) and the second measurement (of a second response of the space to a second electrostatic field) (and usually other measurements as well) to infer the one or more features of the space.

One possible formulation of the space using the graphical model can be as follows. The capacitive sensors are programmable and thus can be viewed as one set of variables (e.g., having excitation signals or polarities as states). Furthermore, the capacitive sensors can sense different measurements, and for that reason, can also be viewed as another set of variables (e.g., having measurements as states). Features of regions in the space is also a kind of variable (with unknown states). Suppose the nodes of the graph include variables associated with the capacitive sensors and variables associated with the features of the regions in the space, and the edges of the graphs can be formulated using quantitative electrostatic relationships (e.g., electrostatic field effects).

Knowing the states of the capacitive sensors and the measurements made by the capacitive sensors, the inference engine can fix observable nodes corresponding to the capacitive sensors within the graph. Once the observable nodes are fixed, the inference engine can make inferences on the hidden nodes corresponding to the unknown features of regions in the space. For instance, the graphical model may allow the inference engine to compute a probability that one unknown feature (a hidden node) has a certain state X based on the states of the capacitive sensors and measurements observed (observable nodes). Multiple probabilities can be computed for the unknown feature having different states to make an inference or draw a conclusion that the unknown feature has a certain state because the corresponding probability is highest among the multiple probabilities. Because many electrostatic fields are used, the model may be replicated for different electrostatic fields and the probabilities computed from the different models may be combined in any suitable manner to make enhanced inferences.

Markov random fields, one special form of belief propagation, may also be applied here to perform inference on features of the space. Markov random fields may be particularly useful if the focused capacitive sensing methods and systems are to be used for imaging. The states of the capacitive sensors and measurements can be the observed nodes while pixels of the reconstructed image can be the hidden nodes of the graphical model. Edges between the nodes can be quantified based on the electrostatic field effects on different materials in the space (corresponding to different pixel values). Performing inference can include applying Markov random fields processing using at least the first measurement (of a first response of the space to a first electrostatic field) and the second measurement (of a second response of the space to a second electrostatic field) (and usually other measurements as well) to infer the one or more features of the space.

Bayesian networks, another special form of belief propagation, may also be applied here to perform inference on features of the space. In some instances, performing inference comprises applying Bayesian network processing using at least the first measurement (of a first response of the space to a first electrostatic field) and the second measurement (of a second response of the space to a second electrostatic field) (and usually other measurements as well) to infer the one or more features of the space.

Other models can be used, including factor graphs, constraint graphs, trees, conditional random fields, or some other models which encapsulates conditional dependence structures between nodes (i.e., variables of the space).

Other models are also envisioned by the disclosure, including Neural Networks, for example.

Shifting Focus

Broadly speaking, multiple measurements of responses to certain electrostatic fields can correspond to a particular region in the space. In other words, the multiple measurements can correspond to a first region in the space, when the electrostatic fields are "tuned" for making multiple measurements focused in the first region. An exemplary focused region is illustrated in FIGS. 2 and 3.

Not only the methods and systems can perform focused capacitive sensing, the programmable electrostatic fields can be "tuned" to focus in a plurality of focused regions. By changing the electrostatic fields to focus in another region, multiple measurements can correspond to another region. In other words, not only the methods and systems can infer one or more features of the space corresponding to one focused region, the method and systems can also infer one or more features of the space corresponding to other focused region(s).

Broadly speaking, the "focus" of the capacitive sensors can shift based on the electrostatic fields used. One combination of electrostatic fields can correspond to one focused region and another combination of electrostatic fields can correspond to another focused region.

Phrased differently, measurements of responses to different selected combinations of electrostatic fields can enable inferences to be made on a plurality of focused regions. Making many measurements using many specialized electrostatic fields, and combining the measurements according to certain combinations can enable inferences to be made on features corresponding to a wide region of the space comprising of many focused regions of the space.

Referring back to FIG. 6, the method can further include reconstructing the space based on those features of many focused regions of the space (box 608). This can be particularly advantageous for one-dimensional, two-dimensional, or three-dimensional imaging of the space.

Selecting Electrostatic Fields

Providing an appropriate electrostatic field using the capacitive sensors is important to the methods and systems disclosed herein. The electrostatic field selector of the system can change the electrostatic field being generated by one or more of the following means: selecting different sets of excitation signals, changing certain one(s) of the excitation signals, selecting certain capacitive sensor(s), and/or moving selected capacitive sensors, etc.

In some cases, the electrostatic field selector changes the electrostatic field according to a pre-set sequence of electrostatic fields. In some instances, the electrostatic field selector can change the electrostatic field based on previous measurements or a state of the inference engine, if it is determined that a certain electrostatic field can improve inference making. The electrostatic field can be associated with a code or pattern selected specifically to derive information (e.g., based on information theory). In some instances, the electrostatic field selector can cause the capacitive sensors to generate a particular electrostatic field to obtain a measurement which can increase confidence of the inference engine. In some instances, the set of excitation signals are selected at random, or pseudo-randomly based on one or more parameters.

In one example, the method for focused capacitive sensing as described in relation to FIG. 6 can further include determining a third set of excitation signals based on the first measurement. The third set of excitation signals excite some capacitive sensor(s) to have a positive polarity and some capacitive sensor(s) to have a negative polarity. The method can also include signaling to the excitation source to excite the capacitive sensors using the third set of excitation signals to generate a third electrostatic field different from the first electrostatic field and receiving a third measurement taken by the capacitive sensors to capacitively sense a third response of the space to the third electrostatic field.

In some embodiments, at least some of the capacitive sensors are movable by an actuator to different spatial arrangements according to one or more of the following: a predetermined sequence of spatial arrangements, a randomized sequence of spatial arrangements, a sequence of spatial arrangements determined based on previous measurements. Movements can be any one or more of the following characteristics: lateral, rotational, vibrational, oscillatory, dampened, etc. Moving the capacitive sensors can generate different electrostatic fields relative to the space, e.g., to probe the same region using different electrostatic fields or to probe different regions using different electrostatic fields. Movement of capacitive sensors can advantageously "scan" of the space.

Different Exemplary Spatial Arrangements, Shapes, and Materials of Capacitive Sensors As discussed above, spatial arrangements of capacitive sensors can affect the electrostatic field generated by those capacitive sensors. Furthermore, the shapes of the capacitive sensors can also affect the electrostatic field generated by the capacitive sensors. For at least some of the capacitive sensors, the physical or spatial arrangement can include any one or more of the following examples: a linear array, a grid comprising row(s) and column(s), circular arrangement, elliptical arrangement, curved arrangement, random arrangement, fractal arrangement, symmetrical arrangement, and geometric pattern.

FIGS. 7-27 illustrates various arrangement and designs of capacitive sensors providing focused capacitive sensing, according to some embodiments of the disclosure. These illustrations are meant to provide exemplary spatial arrangements and shapes of capacitive sensors and are not intended to be limit the scope of the disclosure. Other suitable spatial arrangements and shapes are envisioned by the disclosure. Each of the capacitive sensors can be excited to have a positive or negative polarity with a corresponding excitation signal. The result is a specialized electrostatic field that can be programmable based on the set of excitation signals used to excite the capacitive sensors.

Figure 7:
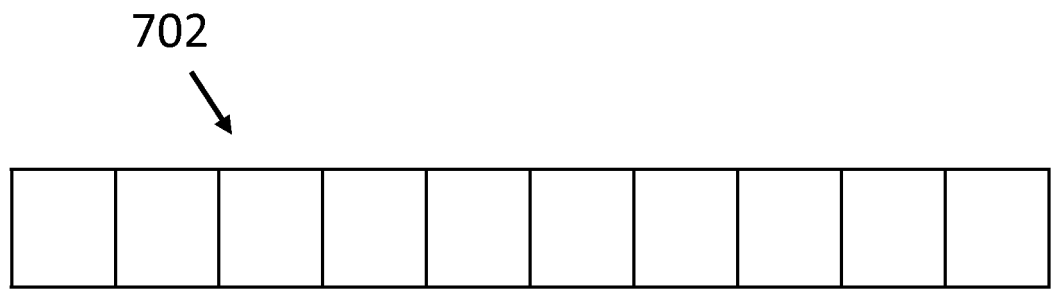
Figure 8:
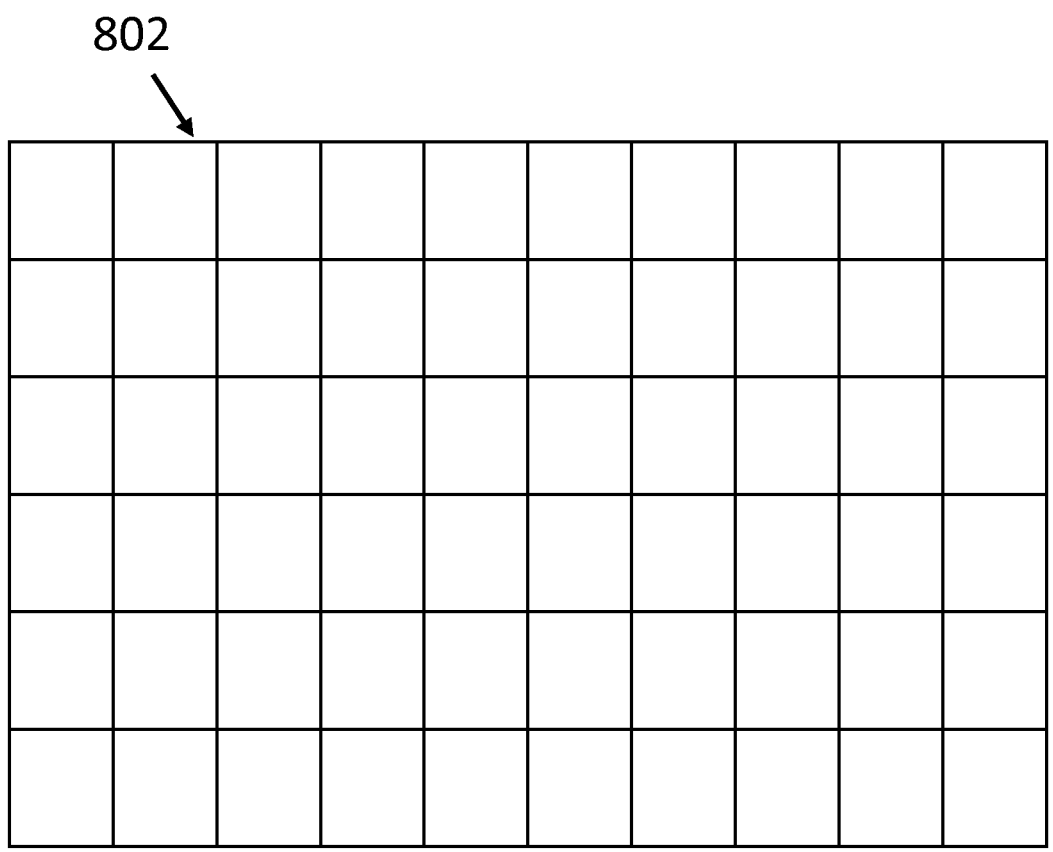

In FIG. 7, a linear array 702 of (10) capacitive sensors is shown. FIG. 8 shows an exemplary grid 802, e.g., having (6) rows and (10) columns of capacitive sensors. Grid of other sizes are envisioned by the disclosure.

FIG. 9 shows two linear arrays 902 and 904 capacitive sensors which are arranged to sense an object 906 in the space between the arrays 902 and 904. One array or certain selected capacitive sensors can be used for generating the electrostatic fields and the other array or certain (other) selective capacitive sensors can be used for sensing the response of the object 906 to the electrostatic fields. All or the same selected capacitive sensors or array can be used for both generating the electrostatic fields and for sensing the responses to the electrostatic fields. The opposing spatial arrangement can be used with other spatial arrangements of capacitive sensors as well, such as curved arrays.

FIGS. 10 and 11 shows exemplary spatial arrangements which stacks rows of capacitive sensors in brick pattern, where the spacings of capacitive sensors in each row is substantially centered on the sensors in the row below (a different way from a plain grid). The spatial arrangement can enable a different electrostatic field to be generated by means of stacking the rows in this manner. In some cases, some rows of the capacitive sensors can move from side to side to change from the shown configuration to a more grid-like configuration. Furthermore, FIG. 10 shows capacitive sensors arranged in a hexagonal area while FIG. 11 shows capacitive sensors arranged in a rectangular area. The span of the electrostatic field can be different depending on the area the capacitive sensors are arranged.

Figure 12:
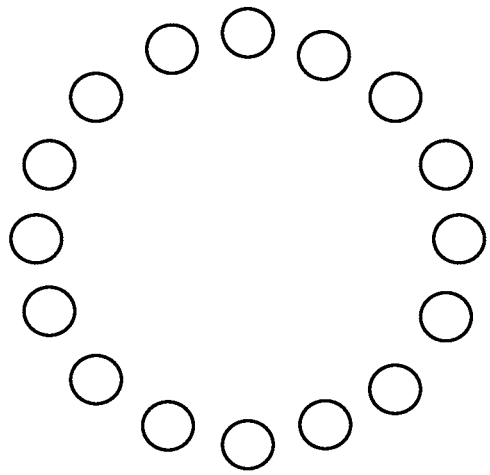
Figure 13:
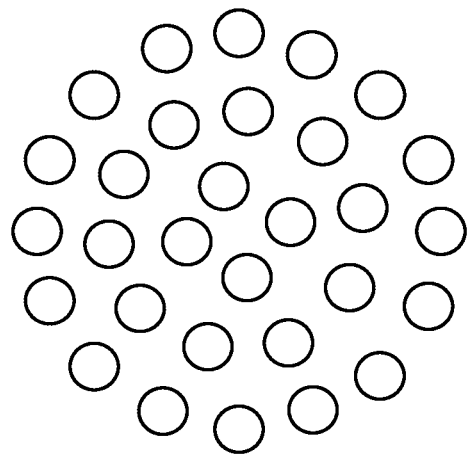
Figure 14:
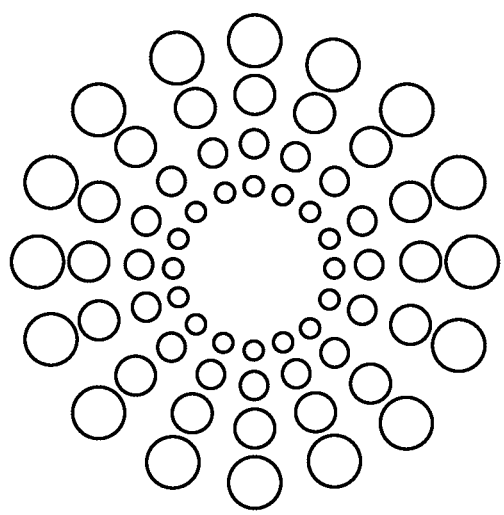
Figure 15:
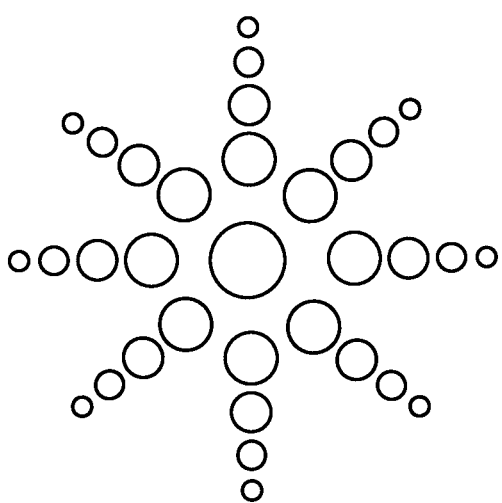

FIGS. 12-15 show some exemplary circular arrangements of capacitive sensors. FIG. 12 has a ring arrangement, while FIG. 13 has capacitive sensors arranged over a circular area. FIGS. 14 and 15 shows examples having capacitive sensors of different sizes arranged over a circular area. Specifically in FIG. 14, the larger sized capacitive sensors are in the outer region of the circular area, while in FIG. 5, the larger sized capacitive sensors are in the inner region of the circular area. The sizing (and possibly the shape) of a sensor can also affect the electrostatic fields generated. In some cases, it is possible to rotate the circular arrangements of FIGS. 12-15 using an actuator along a suitable axis to generate different electrostatic fields relative to the space (e.g., to "scan" the space).

Figure 16:
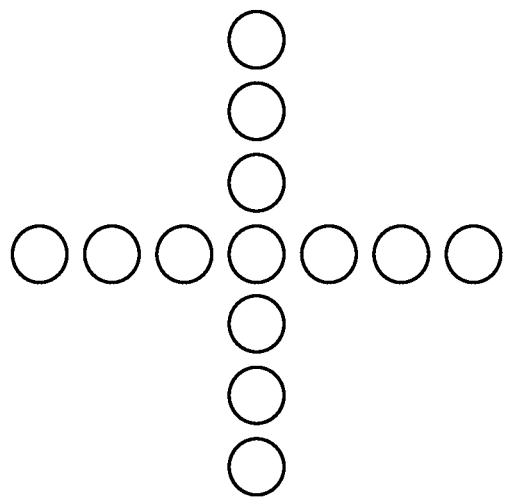
Figure 17:
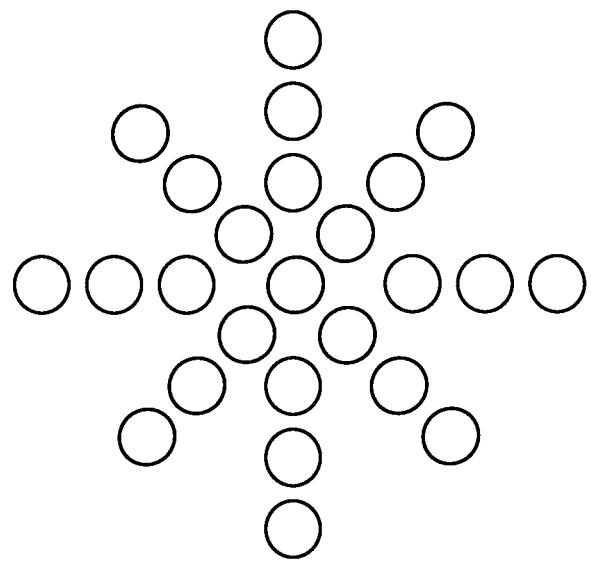
Figure 18:
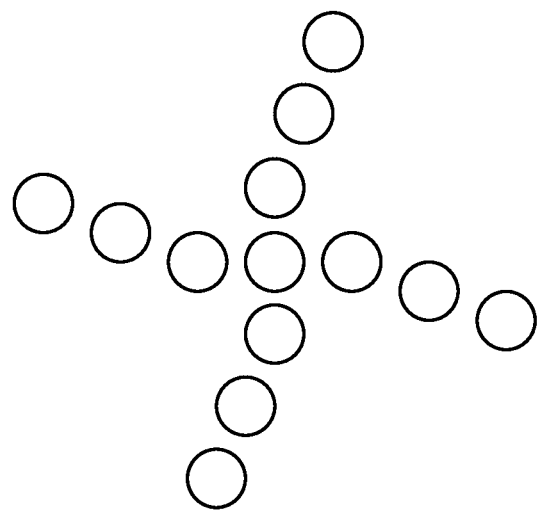
Figure 19:
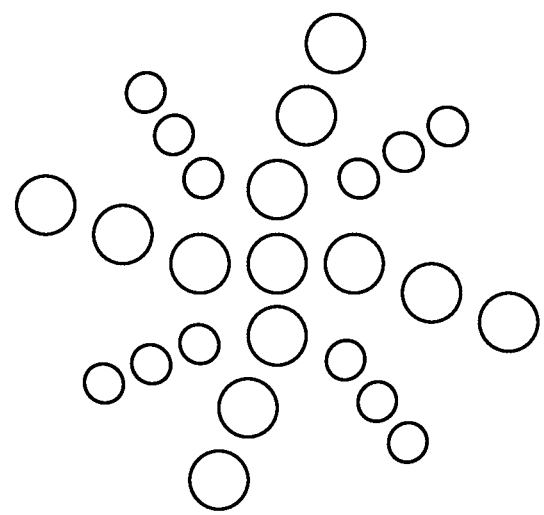

FIGS. 16-19 show some exemplary arrangements having capacitive sensors around a center capacitive sensor. These patterns may be rotated around the center capacitive sensor to generate different electrostatic fields relative to the space (e.g., to "scan" the space). FIG. 16 shows capacitive sensors having a cross arrangement. FIG. 17 shows capacitive sensors having a cross and "X" arrangement. FIGS. 18 and 19 shows curved variants of the examples shown in FIGS. 16 and 17.

Figure 20:
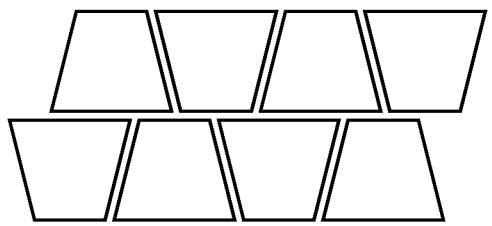
Figure 21:
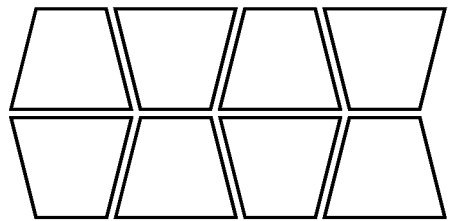
Figure 22:
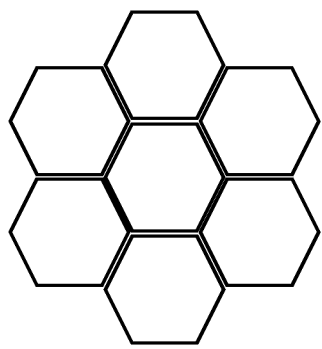
Figure 23:
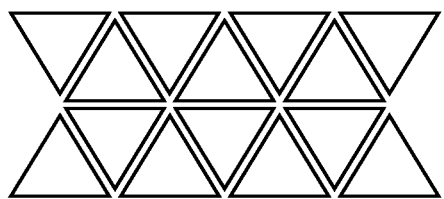
Figure 24:
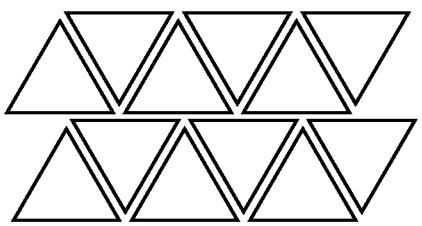
Figure 25:
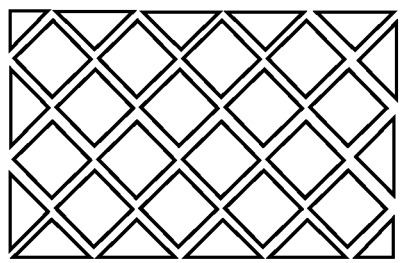
Figure 26:
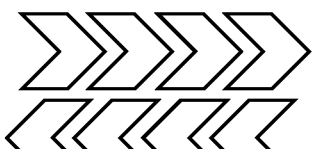
Figure 28:
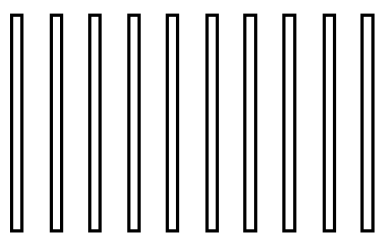
Figure 27:
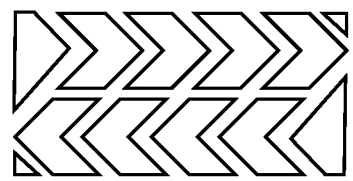

FIGS. 20-27 show yet some exemplary arrangements having capacitive sensors with shapes other than a circular shape. Besides different "span" of the capacitive sensors, shapes of individual capacitive sensors can affect the electrostatic fields radiating from the capacitive sensors. Thus, having special shapes for the capacitive sensors can allow specialized electric fields to be generated. FIGS. 20 and 21 show capacitive sensors having a trapezoidal shape. FIG. 22 shows capacitive sensors having a hexagonal shape arranged in a honeycomb pattern. FIGS. 23 and 24 show capacitive sensors having a triangular shape. FIG. 25 shows capacitive sensors having triangular shape and capacitive sensors having a diamond shape. FIGS. 26 and 27 shows capacitive sensors having a pointed "Chevron" strip pattern. FIG. 28 shows capacitive sensors having an elongated shape resembling strips.

While capacitive sensors can be made of copper or other metals, it is possible for capacitive sensors to be made of materials which are not as conductive as metals, or materials which can carry a lot of electrical charge and/or generate a strong electrostatic field. Broadly speaking, materials usable for the capacitive sensors can include any suitable metallic material, any suitable carbon-based material, indium tin oxide or other heavily doped semiconductor, any suitable conductive plastics, or any suitable conductive material usable as capacitive sensors.

It is envisioned that advanced materials can be used for the capacitive sensors, e.g., such as materials which include carbon nanotubes or some other nanostructure to provide an extremely porous surface (e.g., a large surface area for storing or carrying charge). For instance, a "forest" of carbon nanotubes grown on an aluminum electrode can be used for the capacitive sensor to provide a relatively high capacitance per area.

Variations and Implementations

Note that the activities discussed above with reference to the FIGURES are applicable to any integrated circuits that involve signal processing, particularly those that can execute specialized software programs, or algorithms, some of which may be associated with processing digitized real-time data for focused capacitive sensing (e.g., to provide inference making). Because electrostatics are present in many places in the environment, it is envisioned that focused capacitive sensing can be used in many different applications: ship/boat/submarine navigation, automotive navigation, manufacturing automation, geological surveys, space exploration, security systems, smart home electronics, home appliances, atmospheric sensing, etc.

In certain contexts, the features of focused capacitive sensing discussed herein can be applicable to medical systems, scientific instrumentation, industrial process control, audio and video equipment, and other digital-processing-based systems. Moreover, certain embodiments discussed above can be provisioned in digital signal processing technologies for medical imaging, patient monitoring, medical instrumentation, and home healthcare. This could include pulmonary monitors, heart rate monitors, pacemakers, sleep monitors, scanners, etc. Other applications can involve automotive technologies for safety systems (e.g., stability control systems, driver assistance systems, time-of-flight systems, braking systems, infotainment and interior applications of any kind).

Focused capacitive sensing can be used broadly as a modality for user interfaces. Focused capacitive sensing can be used for sensing in general.

In yet other example scenarios, the teachings of the present disclosure can be applicable in the industrial markets that involve knowledge gathering of space (environment, object, and/or material sensing) for purposes of increasing productivity, energy efficiency, and reliability. For instance, focused capacitive sensing can be used to assess whether there are any structural defects within glass, stone, diamond, composite, or some other material.

In both industrial and consumer applications, the teachings of the signal processing circuits discussed above can be used for environment, object, and/or material sensing as a way to interface or interact with devices. Consumer applications can include any equipment having a machine-to-user interface. Yet other consumer applications can involve advanced touch screen controllers (e.g., for any type of portable media device), gesturing systems, etc. Hence, such technologies could readily part of smartphones, tablets, security systems, robots, PCs, gaming technologies, virtual reality, simulation training, etc.

Parts of various apparatuses for focused capacitive sensing can include electronic circuitry to perform the functions described herein. In some cases, one or more parts of the apparatus can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed signal domain. In some instances, the processor may be configured to carrying out the functions described herein by executing one or more instructions stored on a non-transitory computer medium.

In one example embodiment, any number of components of FIGURES (e.g., parts seen in FIG. 4) may be implemented on one or more boards of an associated electronic system. A board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGURES (e.g., FIG. 4) may be implemented as standalone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the focused capacitive sensing functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims (if any) and/or appended sample embodiments. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims (if any) and/or appended sample embodiments. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to focused capacitive sensing, illustrate only some of the possible functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

In the discussions of the embodiments herein, components of various FIGURES can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims (if any) and/or sample embodiments. Note that all optional features of the apparatus described above may also be implemented with respect to the method or process described herein and specifics in the examples may be used anywhere in one or more embodiments.

Sample Embodiments

Example 1 is a method for focused capacitive sensing of a space using capacitive sensors, the method comprising: exciting the capacitive sensors using a first set of excitation signals to generate a first electrostatic field, wherein the first set of excitation signals excite some capacitive sensor(s) to have a positive polarity and some capacitive sensor(s) to have a negative polarity; taking a first measurement using the capacitive sensors to capacitively sense a first response of the space to the first electrostatic field; exciting the capacitive sensors using a second set of excitation signals different from the first set of excitation signals to generate a second electrostatic field different from the first electrostatic field, wherein the second set of excitation signals excite some capacitive sensor(s) to have a positive polarity and some capacitive sensor(s) to have a negative polarity; and taking a second measurement using the capacitive sensors to capacitively sense a second response of the space to the second electrostatic field.

Example 2 is a method for focused capacitive sensing of a space using capacitive sensors, the method comprising: signaling to an excitation source to excite the capacitive sensors using a first set of excitation signals to generate a first electrostatic field, wherein the first set of excitation signals excite some capacitive sensor(s) to have a positive polarity and some capacitive sensor(s) to have a negative polarity; receiving a first measurement taken by the capacitive sensors to capacitively sense a first response of the space to the first electrostatic field; signaling to the excitation source to excite the capacitive sensors using a second set of excitation signals to generate a second electrostatic field different from the first electrostatic field, wherein the second set of excitation signals excite some capacitive sensor(s) to have a positive polarity and some capacitive sensor(s) to have a negative polarity; and receiving a second measurement taken by the capacitive sensors to capacitively sense a second response of the space to the second electrostatic field.

In Example 3, the method of Example 2, may further include deriving one or more features of the space based on the first measurement and the second measurement.

In Example 4, the method of any one of Examples 2-3 may further comprise: repeating the signaling and receiving steps for a plurality of other electrostatic fields generated by the capacitive sensors using other sets of excitation signals; and deriving one or more features of the space based on further measurements from the repeated receiving step.

In Example 5, the method of any one of Examples 3-4 may further include the one or more features of the space corresponding to a first region in the space.

In Example 6, the method of any one of Examples 3-5 may further include the one or more features of the space corresponding to a first region in the space and a second region in the space.

In Example 7, the method of any one of Examples 3-6 can further include the one or more features of the space corresponding to one or more dielectric constants of one or more regions in the space.

In Example 8, the method of any one of Examples 3-7 can further include deriving one or more features of the space comprising performing inference based on a model of different features of the space using at least the first measurement and the second measurement.

In Example 9, the method of any one of Examples 3-8 can further include deriving one or more features of the space comprising applying belief propagation using at least the first measurement and the second measurement to infer the one or more features of the space.

In Example 10, the method of any one of Examples 3-9 can further include performing inference comprising applying Markov random fields processing using at least the first measurement and the second measurement to infer the one or more features of the space.

In Example 11, the method of any one of Examples 3-10 can further include performing inference comprising applying Bayesian network processing using at least the first measurement and the second measurement to infer the one or more features of the space.

In Example 12, the method of any one of Examples 3-11 can further include the one or more features of the space corresponding to one or more values of an image representative of the space.

In Example 13, the method of any one of Examples 3-12 can further include the one or more features of the space corresponding to one or more densities of regions in the space.

In Example 14, the method of any one of Examples 3-13 can further include the one or more features of the space corresponding to one or more characteristics of materials present in the space.

In Example 15, the method of any one of Examples 3-14, wherein the one or more features of the space corresponds to one or more characteristics of surfaces present in the space.

In Example 16, the method of any one of Examples 3-15 can further include: determining a third set of excitation signals based on the first measurement, wherein the third set of excitation signals excite some capacitive sensor(s) to have a positive polarity and some capacitive sensor(s) to have a negative polarity; signaling to the excitation source to excite the capacitive sensors using the third set of excitation signals to generate a third electrostatic field different from the first electrostatic field; and receiving a third measurement taken by the capacitive sensors to capacitively sense a third response of the space to the third electrostatic field.

Example 17 is an apparatus for focused capacitive sensing of a space using capacitive sensors, the apparatus comprising: an excitation source to excite the capacitive sensors using a different sets of excitation signals to generate different electrostatic fields, wherein the sets of excitation signals excite some capacitive sensor(s) to have a positive polarity and some capacitive sensor(s) to have a negative polarity; and a sampling circuit to take measurements using the capacitive sensors to capacitively sense responses of the space to the different electrostatic fields.

Example 18 is an apparatus for focused capacitive sensing of a space, the apparatus comprising capacitive sensors; an excitation source to excite the capacitive sensors using a different sets of excitation signals to generate different electrostatic fields, wherein the sets of excitation signals excite some capacitive sensor(s) to have a positive polarity and some capacitive sensor(s) to have a negative polarity; and a sampling circuit to take measurements using the capacitive sensors to capacitively sense responses of the space to the different electrostatic fields.

In Example 19, the apparatus of Example 17 or 18 can further include the excitation source exciting a first subset of the capacitive sensors; and the sampling circuit taking measurements using a second subset of the capacitive sensors different from the first subset of the capacitive sensors.

In Example 20, the apparatus of any one of Examples 17-19 can further include at least some of the capacitive sensors being physically arranged according to one or more of the following spatial arrangements: a linear array, a grid comprising row(s) and column(s), circular arrangement, elliptical arrangement, curved arrangement, random arrangement, fractal arrangement, symmetrical arrangement, and geometric pattern.

In Example 21, the apparatus of any one of Examples 17-20 can further include at least some of the capacitive sensors being movable an actuator to different spatial arrangements to generate different electrostatic fields and/or take measurements in response to the different electrostatic fields.

In Example 22, the apparatus of any one of Examples 17-21 can further include at least some of the capacitive sensors being movable by an actuator to different spatial arrangements according to one or more of the following: a predetermined sequence of spatial arrangements, a randomized sequence of spatial arrangements, a sequence of spatial arrangements determined based on previous measurements.

In Example 23, the apparatus of any one of Examples 17-22 can further include at least one of the capacitive sensors has a different size and/or shape from other one(s) of the capacitive sensors.

Example 24 is a computer readable non-transitory storage medium having instructions stored thereon for focused capacitive sensing, wherein the instructions when executed by at least one processors cause the at least one processors and/or circuitry to perform the following operations according to any one of the methods of Examples 1-16.

The invention claimed is:

1. A method for focused capacitive sensing of a space using capacitive sensors, the method comprising:
   exciting the capacitive sensors using a first set of aperiodic excitation signals to generate a first electrostatic field, wherein the first set of aperiodic excitation signals excite some capacitive sensor(s) to have an on average positive polarity and some capacitive sensor(s) to have an on average negative polarity;
   taking a first measurement using the capacitive sensors to capacitively sense a first response of the space to the first electrostatic field;
   exciting the capacitive sensors using a second set of aperiodic excitation signals different from the first set of aperiodic excitation signals to generate a second electrostatic field different from the first electrostatic field, wherein the second set of aperiodic excitation signals excite some capacitive sensor(s) to have an on average positive polarity and some capacitive sensor(s) to have an on average negative polarity; and
   taking a second measurement using the capacitive sensors to capacitively sense a second response of the space to the second electrostatic field;
   wherein, at least two adjacent capacitive sensors are excited to have the same on average polarity.

2. A method for focused capacitive sensing of a space using capacitive sensors, the method comprising:
   signaling to an excitation source to excite the capacitive sensors using a first set of aperiodic excitation signals to generate a first electrostatic field, wherein the first set of aperiodic excitation signals excite some capacitive sensor(s) to have a positive polarity and some capacitive sensor(s) to have a negative polarity;
   receiving a first measurement taken by the capacitive sensors to capacitively sense a first response of the space to the first electrostatic field;
   signaling to the excitation source to excite the capacitive sensors using a second set of aperiodic excitation signals to generate a second electrostatic field different from the first electrostatic field, wherein the second set of aperiodic excitation signals excite some capacitive sensor(s) to have a positive polarity and some capacitive sensor(s) to have a negative polarity; and
   receiving a second measurement taken by the capacitive sensors to capacitively sense a second response of the space to the second electrostatic field;
   wherein, at least two adjacent capacitive sensors are signaled to have the same polarity.

3. The method of claim 2, the method further comprising:
   deriving one or more features of the space based on the first measurement and the second measurement.

4. The method of claim 2, the method further comprising:
   repeating the signaling and receiving steps for a plurality of other electrostatic fields generated by the capacitive sensors using other sets of excitation signals; and
   deriving one or more features of the space based on further measurements from the repeated receiving step.

5. The method of claim 3, wherein the one or more features of the space corresponds to a first region in the space.

6. The method of claim 3, wherein the one or more features of the space corresponds to a first region in the space and a second region in the space.

7. The method of claim 3, wherein the one or more features of the space corresponds to one or more dielectric constants of one or more regions in the space.

8. The method of claim 3, wherein deriving one or more features of the space comprises:
   performing inference based on a model of different features of the space using at least the first measurement and the second measurement.

9. The method of claim 3, wherein deriving one or more features of the space comprises:
   applying belief propagation using at least the first measurement and the second measurement to infer the one or more features of the space.

10. The method of claim 3, wherein performing inference comprises applying Markov random fields processing using at least the first measurement and the second measurement to infer the one or more features of the space.

11. The method of claim 3, wherein performing inference comprises applying Bayesian network processing using at least the first measurement and the second measurement to infer the one or more features of the space.

12. The method of claim 3, wherein the one or more features of the space corresponds to one or more values of an image representative of the space.

13. The method of claim 3, wherein the one or more features of the space corresponds to one or more densities of regions in the space.

14. The method of claim 3, wherein the one or more features of the space corresponds to one or more characteristics of materials or surfaces present in the space.

15. The method of claim 3, further comprising:
   determining a third set of aperiodic excitation signals based on the first measurement, wherein the third set of aperiodic excitation signals excite some capacitive sensor(s) to have a positive polarity and some capacitive sensor(s) to have a negative polarity;
   signaling to the excitation source to excite the capacitive sensors using the third set of aperiodic excitation signals to generate a third electrostatic field different from the first electrostatic field; and
   receiving a third measurement taken by the capacitive sensors to capacitively sense a third response of the space to the third electrostatic field.

16. An apparatus for focused capacitive sensing of a space using capacitive sensors, the apparatus comprising:
   an excitation source to excite the capacitive sensors using a different sets of aperiodic excitation signals to generate different electrostatic fields, wherein the sets of aperiodic excitation signals excite some capacitive sensor(s) to have an on average positive polarity and some capacitive sensor(s) to have an on average negative polarity; and
   a sampling circuit to take measurements using the capacitive sensors to capacitively sense responses of the space to the different electrostatic fields;
   wherein, the excitation source is configured to excite at least two adjacent capacitive sensors to have the same on average polarity.

17. The apparatus of claim 16, wherein:
the excitation source excites a first subset of the capacitive sensors; and
the sampling circuit takes measurements using a second subset of the capacitive sensors different from the first subset of the capacitive sensors.

18. The apparatus of claim 16, wherein:
at least some of the capacitive sensors are physically arranged according to one or more of the following spatial arrangements: a linear array, a grid comprising row(s) and column(s), circular arrangement, elliptical arrangement, curved arrangement, random arrangement, fractal arrangement, symmetrical arrangement, and geometric pattern.

19. The apparatus of claim 16, wherein:
at least some of the capacitive sensors are movable an actuator to different spatial arrangements to generate different electrostatic fields and/or take measurements in response to the different electrostatic fields.

20. The apparatus of claim 16, wherein:
at least some of the capacitive sensors are movable by an actuator to different spatial arrangements according to one or more of the following: a predetermined sequence of spatial arrangements, a randomized sequence of spatial arrangements, a sequence of spatial arrangements determined based on previous measurements.

* * * * *